Oct. 26, 1943. M. R. MORGENTHALER 2,333,027
PROCESS FOR THE MANUFACTURE OF SOLUBLE DRY EXTRACTS
Filed Feb. 26, 1940
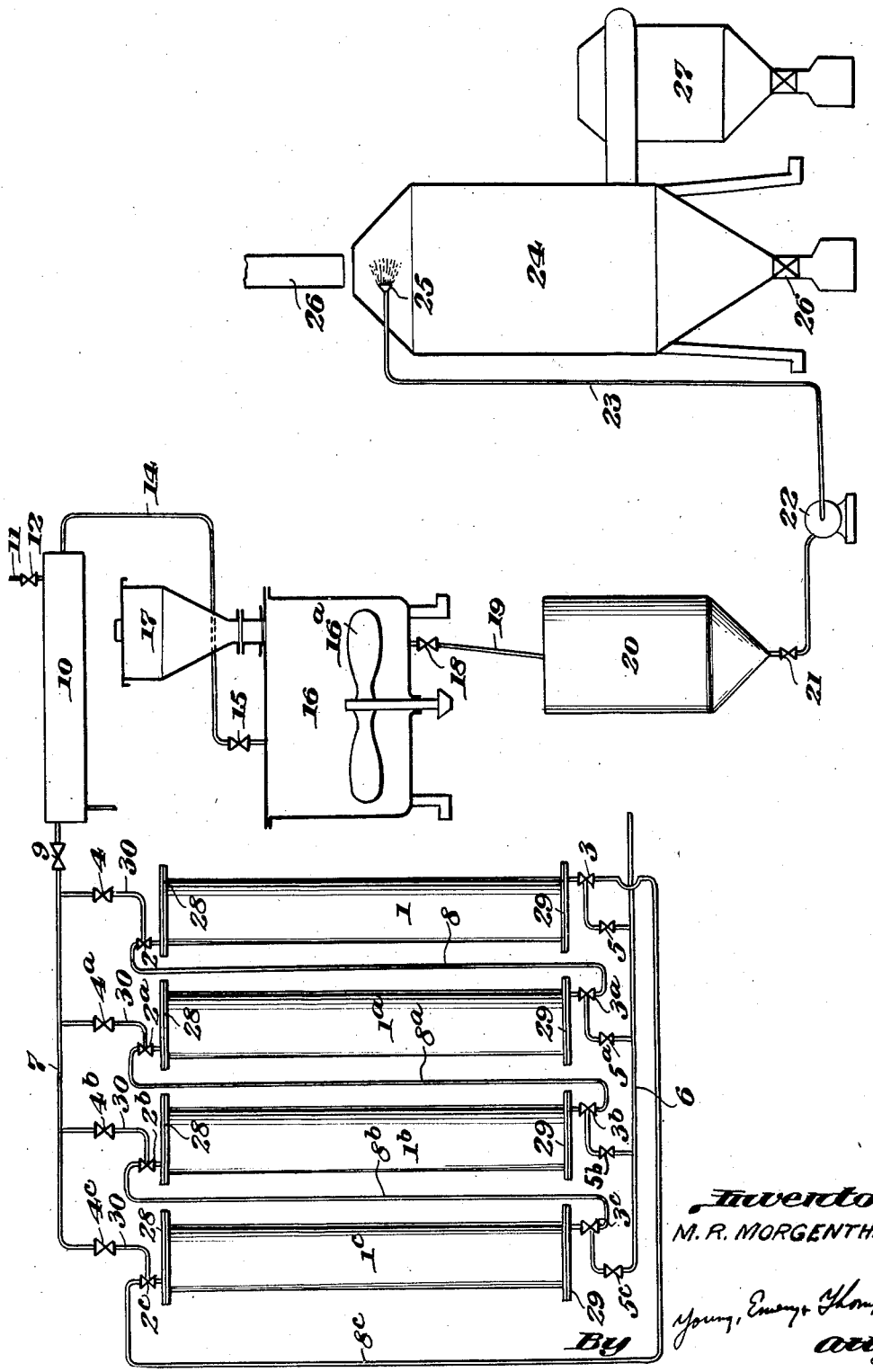

Patented Oct. 26, 1943

2,333,027

UNITED STATES PATENT OFFICE 2,333,027

PROCESS FOR THE MANUFACTURE OF SOLUBLE DRY EXTRACTS

Max Rudolf Morgenthaler, Vevey, Switzerland, assignor, by mesne assignments, to Inredeco, Inc., Panama City, Panama, a corporation of Panama Application February 26, 1940, Serial No. 320,938
In Switzerland February 18, 1937

1 Claim. (Cl. 99—71)

The present invention relates to a product, apparatus and a process for obtaining, in a liquid form by means of percolation, the volatile, soluble constituents of a product which swells when impregnated with water or any other liquid. The liquid thus obtained can be subsequently reduced to a dry or powdered form, with or without the addition of aroma-sealing agents.

The present application is a continuation-in-part of applicant's co-pending application, Serial No. 260,218 filed March 6, 1939, the latter being a continuation in part of the original application filed June 29, 1937, Serial No. 151,058.

The main object of the present invention is to produce an improved product by a novel process and in a novel apparatus and of which certain advantages and objects will be apparent from the following description taken in connection with the accompanying drawing which is a diagrammatic view of the apparatus.

The process and product will be described first in relation to coffee.

The invention concerns a process of manufacturing a liquid coffee extract, thoroughly filtered and partially defatted, this liquid extract being subsequently combined with carbohydrates and the mixture spray-dried. Measures are taken to prevent any loss of aromatic substances during the manufacturing process.

The main difficulty in preparing coffee extracts consists in retaining the aromatic substances which are released during infusion of the coffee and during the further manufacturing steps, until these aromatic substances are fixed in stable form in the dry extract. All unnecessary manufacturing steps should be avoided and the process made as simple as possible. The filtering of the liquid extract, for instance, can be avoided according to this process. It is a known fact that liquid extracts, prepared by the known method of percolation have an excess fat content, so that when in dry form, they soon become rancid. According to the present process, about 85% of this excess fat content is retained by the coffee grounds.

It has been found that a thoroughly filtered extract, deprived of its fatty substances up to 85%, can be obtained when using a percolator of sufficient length, if the coffee is of a suitable grain. Good results are obtained with a percolator of 15 metres in length and coffee of a rather coarse grain.

It is rather difficult to set forth exact indications and figures as to the size of the ground coffee particle. It is well known that when grinding coffee, particles of various sizes will be obtained; the smaller particles cannot be eliminated before preparing the infusion, so that the percolator will be filled with particles of various sizes. It is also known that the smaller the coffee particles, the better the extract. However, it has been found that if the coffee beans are ground too fine, that is, if there are more small particles than large particles, the ground coffee will swell as soon as it becomes wet and the entire mass of ground coffee will stick together, forming a cake, so that the percolating water can no longer circulate. It is, therefore, necessary to find the correct relation between the length of the percolator and the size of grain to which the coffee should be ground, which can be determined by any expert in the art.

The liquid extract, thoroughly filtered and partly defatted, is somewhat concentrated. However, it has the disadvantage that the aromatic substances are not fixed, since the latter can escape through evaporation. It is, therefore, preferable to spray-dry the liquid extract, after adding to the latter a given quantity of carbohydrates, having the necessary properties for retaining and permanently sealing the aromatic substance contained in roasted coffee, during, and particularly after, the drying process, these aromatic substances being released upon subsequent dilution.

Many soluble carbohydrates and their derivatives have the requisite qualities for retaining aromatic substances; for example, the product obtained through hydrolysis (by means of acid) of the coffee grounds emanating from the previous infusion; or the maltose or malto-dextrine obtained by malting such coffee grounds to a given degree; or the product obtained from the combination of the above two processes. Other soluble carbohydrates, such as malto-dextrine, maltose or glucose, prepared from other substances, which are capable of sealing the aromatic substances while in a dry state and releasing them on subsequent dilution, can also be used, as well as derivatives therefrom or various mixtures of the above carbohydrates and/or of their derivatives. The dry weight of the sealing material added should be preferably about the same as that of the total solids in the coffee infusion. It is also preferable to use carbohydrates which are as colorless, odorless and tasteless as possible, so that their color, odor and taste are not perceptible in the solution prepared from the dry coffee extract containing added carbohydrates.

The carbohydrates, or the mixture of two or more carbohydrates, can be added in the form of an aqueous solution to the coffee infusion, or, if in a solid form, said carbohydrates or the mixture thereof can be dissolved directly in the infusion. The weight of the carbohydrates to be added, should preferably correspond to approximately that of the total solids in the coffee infusion.

The accompanying drawing illustrates an apparatus which may be used to advantage when putting this invention into practice.

A set of percolators 1, 1a, 1b and 1c are interconnected so that they operate in series. Each percolator is composed of a tube or shell whose external wall can be heat-insulated. each said tube having a top 28 and a bottom 29, both of which are removable. The interior wall of the tube is slightly conical, and its internal diameter increases from the top to the bottom. This shape is necessary in order to facilitate the emptying of the coffee grounds from the tube.

The apparatus is provided with three-way valves 3, 3a, 3b and 3c and also with three-way valves 2, 2a, 2b and 2c. The hot water which is used in making the coffee extract is forced through the inlet pipe 6. The percolators 1, 1a, 1b and 1c have respective outlet pipes 8, 8a, 8b and 8c. Each outlet pipe is connected to the top cap 28 of the respective percolator and each said outlet pipe has one of the three-way valves 2, 2a, 2b and 2c. The inlet pipe 6 is connected to the bottom caps 29 of the percolators 1, 1a, 1b and 1c by respective pairs of valves 3 and 5, 3a and 5a, 3b and 5b, and 3c and 5c. The valves 2, 2a, 2b and 2c are respectively connected by branch pipes 30 to respective valves 4, 4a, 4b and 4c which are connected by means of branch pipes to the inlet pipe 7 of the refrigerator or cooling device 10. The branch pipe 8 connects the outlet valve 2 of the percolator 1 to the inlet valve 3a of the percolator 1a, and the outlet pipe of every other percolator correspondingly connects the outlet valve of the respective percolator to the inlet valve of the next succeeding percolator. By closing the valve 4, for example, the branch pipe 30 between the valves 2 and 4 can be easily removed and the pipe connection between the valve 2 and the respective cap 28 can also be easily removed. The top cap 28 of any of the percolators can thus be easily removed. Likewise, by closing the valve 5, the pipe connections between the valve 5 and the bottom cap 29 of the percolator 1 can be easily removed, thus permitting the easy removal of the bottom cap 29 of the percolator 1. The same procedure can be followed when it is desired to remove the bottom cap 29 of any of the other percolators.

The cooling device 10 has a jacket which is supplied with brine through the pipe 11 and the valve 12 so that the coffee infusion can be cooled down to a rather low temperature. The valve 9 can be closed to stop the admission of coffee infusion, thus permitting the cleaning of the cooling device. The cooler 10 is connected at the other end by means of a pipe 14 and valve 15 with the vat 16 where the coffee infusion is collected. This vat 16 is provided with a hopper 17 which is used for adding the carbohydrates to the cooled coffee extract. The vat 16 is also provided with a set of stirring blades 16a in order that the carbohydrates may be thoroughly mixed with the coffee infusion. This mixing device is driven by any suitable means (not shown). A pipe 19, provided with a valve 18, connects the bottom of the vat 16 to a holding tank or vat 20, into which the mixture of coffee infusion and carbohydrates flows. The inlet of a pump 22 is connected through a valve 21 to the outlet of tank 20. Said pump forces the liquid mixture through outlet pipe 23, into a spray-drying apparatus 24 of known construction. A pipe 26 directs a jet of hot air on the liquid which is discharged through spraying nozzle 25, and a valve 26 of known construction is used for periodically emptying the dry product from the spray-drying apparatus. A dust collector 27 collects the fine particles of dry coffee extract.

The operation of the apparatus is substantially as follows:

Three of the percolators (each five metres long), such as the percolators 1, 1a, and 1b, are filled with ground, roasted coffee of a suitable grain size. The tops 28 of the three selected percolators are closed. Fresh hot water at a temperature of about 130° C. is forced through pipe 6 and valves 5 and 3, into the bottom of percolator 1, and upwardly through the column of coffee therein, to the top of percolator 1. As soon as this water reaches the top of the percolator 1, it flows through valve 2, pipe 8 and valve 3a into the bottom of percolator 1a, thus filling percolator 1a. The same process is repeated when the water, upon reaching the top of percolator 1a, is led through valve 2a, pipe 8a and valve 3b into the bottom of percolator 1b and upwardly through percolator 1b. When the water reaches the top of percolator 1b, it will have circulated through layers of ground, roasted coffee whose total length is about fifteen metres. The resultant coffee infusion is of suitable strength and is then led through the three-way valves 2b and 4b and pipe 7 to the cooling device 10, in which it is cooled to about 10° C. The cooled coffee infusion is accumulated in vat 16. As soon as a suitable quantity of coffee infusion is accumulated in this vat 16, the total solid content of the coffee extract is determined and the corresponding quantity of carbohydrates is added in dry or liquid form through the hopper 17. The blades 16a are now placed in motion until a thorough mixture is obtained. Then vat 16 is then emptied into the vat 20. By means of the pump 22, the mixture is forced through the spraying nozzle 25 and the small drops of liquid are dried when they reach the current of hot air flowing from pipe 26. The largest particles are collected at the bottom of the drying chamber 24 and the smallest at the bottom of the dust collector 27.

Referring to the set of four percolators, three of said percolators are always in use, the fourth percolator being emptied during this time and then being also filled with fresh, ground roasted coffee, during the time that the other three percolators are in use. This procedure allows for continuous operation. As soon as the ground coffee in percolator 1 has been sufficiently extracted, percolator 1 is placed out of service and the water running from percolator 1b, instead of being led through pipe 7 to the cooling device 10, is led through valve 2b, pipe 8b and valve 3c into the bottom of the percolator 1c and the outlet valve 2c of percolator 1c is connected through the respective branch pipe 30 and valve 4c and pipe 7 and valve 9, to the cooling device 10. Instead of using the collecting vat 20, two vats 16, both provided with mixing blades 16a can be used and placed alternatively into service.

By the one method of procedure of this present invention, other products, for instance, chicory, can be added to the coffee. The infusion of this mixture with water is treated in the same manner as an infusion of coffee in accordance with the process set forth in the description of the present invention.

The following examples illustrate how the invention may be put into effect.

*Example I*

About 600 kgs. of freshly roasted and ground coffee are placed in a set of percolators of suitable size, which are operated under pressure. Water which heated to about 130° C. is then circulated through the selected percolators, until about 2000 to 2300 litres of filtered, partially defatted liquid coffee extract, with a total solid content of about 7%, have been collected in the refrigerator 10 for intensive cooling. 100 litres of a solution containing about 50% solids and previously prepared by dissolving the product which is obtained through hydrolysis (by acid) of the coffee grounds which are the residue of a previous infusion, are added as quickly as possible to about 750 litres of this coffee extract and the mixture, in a cold state, is dried to powdered particles in a spray-drying plant. If the infusion contains about 20% total solids extracted from the coffee, 3 grs. of the powdered coffee extract prepared according to the invention, suffice for one cup of coffee of a capacity of 100 cc.

*Example II*

Instead of coffee, a mixture of coffee and chicory can be used for preparing the infusion. The latter is made in the some manner as mentioned in Example I, until about 1000 lit. of liquid coffee-chicory extract, containing about 16% total solids, have been collected. In one litre of this infusion, containing about 160 grs. of total solids, about 160 to 180 grs. of dry malto-dextrine are dissolved as soon as possible and the mixture dried to powder form in a spray-drying apparatus.

The powder, manufactured according to the present invention, having been made from a coffee extract which has been thoroughly filtered in the percolators by means of the swelled coffee grounds, is almost entirely soluble in hot water, milk, etc., that is, it leaves no residue. It is thus possible to prepare coffee directly in a cup, by adding hot water, preferably just at the boiling point, to the powdered coffee extract, without leaving any undissolved residue.

Since the coffee extract in powder form is highly hygroscopic, it must be packed in air-tight containers. If packed in this manner, it can be kept for a long period and it will not become rancid, because it is partially de-fatted.

The coffee extract in powder form is practically odorless at normal temperature, thus indicating that the aromatic substances have been effectively sealed and that the quality of the powder, insofar as its content of aromatic substances is concerned, does not deteriorate in course of time.

It is of great importance, in carrying out this process, that the liquid extract resulting from the exhaustive extraction with hot water, be immediately and intensively cooled and it is preferable that the cooled, liquid extract be immediately mixed with the cold solution of carbohydrates and this mixture likewise spray-dried at once into a multitude of combined particles in order to prevent, as far as possible, the escape of any aroma from the aromatic substances before the aroma is sealed in the dry particles by the carbohydrates.

The process is, of course, also applicable to various other products, which will swell when impregnated with water, and which contain volatile, aromatic substances.

In order to produce a better product, it is advisable that air should not come in contact with the product, when carrying out the exhaustive extraction of the aromatic substances. The liquid extract during cooling should also not come in contact with the air. Furthermore, before spraying, a certain amount of previously sprayed and dried particles should be added to the cold solution of extract and carbohydrates, in order to bring about a higher concentration, thereby obtaining a coarser and more easily soluble powder. The latter result can also be accomplished by freezing out a certain amount of water from the liquid extract, or from the mixed solution of extract and carbohydrates, before spraying.

I claim as my invention:

In the art of making a dry, powdered coffee extract, those steps which consist in forcing hot water through a mass of roasted and ground coffee whose length is at least approximately 15 metres, and filtering out and retaining at least approximately 85% of the fat of the resultant liquid coffee extract, by means of the roasted and ground coffee.

MAX RUDOLF MORGENTHALER.